United States Patent [19]

Evans, Jr.

[11] 4,213,707
[45] Jul. 22, 1980

[54] DEVICE FOR IMPROVING THE ACCURACY OF OPTICAL MEASURING APPARATUS AND THE LIKE

[75] Inventor: John D. Evans, Jr., Kingsport, Tenn.

[73] Assignee: Eastman Kodak Company, Rochester, N.Y.

[21] Appl. No.: 33,074

[22] Filed: Apr. 25, 1979

[51] Int. Cl.² ............... G01B 11/02; G01B 11/08
[52] U.S. Cl. .............................. 356/387; 356/384; 356/429
[58] Field of Search ............ 356/381, 384, 385, 386, 356/387, 429; 250/571

[56] References Cited

U.S. PATENT DOCUMENTS

| | | | |
|---|---|---|---|
| 3,518,441 | 6/1970 | Selqin | 356/381 |
| 3,765,774 | 10/1973 | Petrohilos | 356/387 |
| 3,905,705 | 9/1975 | Petrohilos | 356/387 |
| 4,007,992 | 2/1977 | Petrohilos et al. | 356/429 |

Primary Examiner—John K. Corbin
Assistant Examiner—R. A. Rosenberger
Attorney, Agent, or Firm—Malcolm G. Dunn; Daniel B. Reece, III

[57] ABSTRACT

Device for attachment to gauging instruments such as optical measuring apparatus, which measure dimensional parameters of articles by scanning the surface or main profile of the article with a light beam as from a laser, the device employing a leaf spring assembly for bearing against and conforming to a portion of the surface of the article; the leaf spring assembly thereby forming a substitute profile over the main profile of the article or of a transparent article, and suppressing any surface anomalies projecting from the article surface, thus providing a reference surface which may be measured by such gauging instruments as representative of the dimensional parameter of the main profile of the article.

7 Claims, 6 Drawing Figures

DEVICE FOR IMPROVING THE ACCURACY OF OPTICAL MEASURING APPARATUS AND THE LIKE

BACKGROUND OF THE INVENTION

The present invention relates to optical measuring apparatus which measures the thickness, diameter, circumference or other dimensional parameters of articles by scanning the surface of the article; and is particularly directed to a device for use with optical measuring apparatus to enable such optical measuring apparatus to make more accurate measurements of transparent articles or of the main profile of an article having surface anomalies projecting from the main profile.

In the prior art there are optical measuring apparatus which measure a dimension of an object or article without making physical contact with the article because they may use a scanning light beam from a light source, such as a laser, to make the desired measurement or measurements.

For instance, in U.S. Pat. No. 3,765,774, the disclosed optical measuring apparatus, with which the device of the present invention may be particularly suited to be used, has a laser light source which produces a narrow light beam having a diameter of approximately 1 millimeter. According to the description in the patent, the light beam is converted into a rotary scanning light beam by a mirror positioned within the path of the light beam at an angle of 45° and mounted on a flywheel driven by a synchronous motor. The motor receives a power supply from a high frequency pulse generator or clock through an adjustable frequency divider. The rotary scanning light beam is directed through a scanner lens which converts the rotary scanning light beam to a parallel scanning light beam, and the article to be measured is located at approximately the focal point of the lens where the diameter of the light beam is minimized. On the other side of the article to be measured, and also within the path of the light beam, is another lens, the receiver lens, which converges or focuses the parallel scanning light beam onto a photodetector, which produces pulses or signals when the light reaching the photodetector changes in intensity. The signals are amplified and transmitted to a decoder which incorporates means for selecting different combinations of the signals according to the dimension to be measured. The decoder transmits the selected signals to a gate which also receives the high frequency pulses from the clock, and the output of the gate is transmitted to a pulse counter calibrated so that each counted pulse represents a finite unit of length such as 0.0005 inch. The output of the pulse counter controls a digital read-out display.

In brief, the parallel scanning light beam scans between two known reference points, and when an article is placed within the path of the parallel scanning light beam, the blackout time of the light beam, as sensed by the photodetector, corresponds precisely to the dimension of the article represented by the interruption of the parallel scanning light beam. In other words, the interrupted beam is collected by the receiver lens and focused onto a photodetector which converts the light signal to a time dependent signal. The time dependent signal is processed by appropriate electronic circuitry as shown in the patent, to give the desired read-out. The object or article to be measured may be stationary or moving as, for example, for monitoring the diameter of a wire being drawn or extruded.

Other measurements or monitorings may include those involving the diameters of rods and cylinders; the thickness of a paper web; the thickness of a plastic insulation coating on a wire; monitoring inside and outside diameters of annular articles, glass tubing and rubber hose; measuring or monitoring steel, copper, brass tubing and profiles; making hole measurements; making length measurements; and measuring or monitoring belt or sheet thickness for rolling mills.

Any physical measurement including length, width, diameter, thickness may be made where a beam of light can be used to differentiate the beginning and end of the dimension.

Other embodiments of the optical measuring apparatus of the above-mentioned patent are disclosed in U.S. Pat. Nos. 3,905,705 and 4,007,992.

In the manufacture of tobacco smoke cigarette filter rods, one of the primary physical properties which must be controlled is the circumference. Traditionally, filter rod circumference has been measured by means of pneumatic gauges, which are well known in the industry. With the growth of low tar cigarettes, filter rods wrapped with porous plugwrap have become increasingly popular. The circumference of porous wrapped filter rods, however, cannot be measured accurately with the traditional pneumatic gauges because of air penetration into the porous wrap. When the sense air penetrates the porous wrap, there is a loss of back pressure, the air being lost outside the plenum chamber. For instance the sense air upon entering the porous rod will progress along the rod axis and exit either through the porous wrap outside the circumference head of the instrument involved, or exit the tip of the filter rod itself.

In attempting to use laser scanning apparatus such as disclosed in the three patents above, there is a loss of accuracy when measuring the circumference of porous wrapped tobacco smoke filter rods or when measuring diameters, circumferences, etc., of non-wrapped filter-type rods, for whatever their uses may be. The errors are caused by two factors. The first factor is the surface fuzz associated with porous wraps and the non-wrapped cellulose acetate rods. A fuzzy surface on a filter rod tends to cause the optical measuring apparatus to overstate the circumference because the surface fibrils of the porous wrap project above the main profile of the filter rod. This situation was proved when a metal standard for the filter rod was used and then lint was applied to the surface of the metal standard. The optical measuring apparatus read higher than the actual metal standard value. The second factor which has contributed to error has been that of the seam lip on the porous wrapped filter rod, the distance from the edge of the seam to the surface of the rod.

Other instances where fuzzy surfaces or other types of surface irregularities projecting from the main profile of the object or article to be measured or monitored may cause error include the fuzzy surface of paper webs, and water droplets or other liquid droplets on the surfaces of wire or plastic or otherwise insulated wire as it is being drawn or extruded.

In the instance of using optical instruments for measuring or monitoring glass rods which are transparent, certain errors may be induced because part of the scanning light beam may pass through the transparent glass surface or through a portion thereof rather than be totally interrupted by the presence of the transparent article within the light beam scanning path.

The above-mentioned U.S. Pat. No. 4,007,992 represents one solution for trying to avoid surface irregularities. This patent is directed to an optical measuring apparatus where the scanning light beam is shaped to be wider than the dimension of any single particle of foreign material so as to be greater than the dimension or irregularities on the surface of an article. When the light beam is scanned across the article an average contour is sensed, i.e., the light beam is greater in magnitude than any individual particle of foreign material upon the surface of the object. In this manner only a portion of the light beam is interrupted by the surface particle and a major portion of the beam passes the particle on the article. This solution may be effective for isolated foreign particles on the surface of an article, but is not effective when there are so many surface fibrils projecting from the main profile of the article that the apparatus determines that the main profile is greater in dimension that it actually is.

An object, therefore, of the invention is to provide a device that may be readily attached to an apparatus such as the optical measuring apparatus disclosed in the aforementioned U.S. Pat. Nos. 3,765,774 and 3,905,705, or to other types of optical measuring or monitoring apparatus so as to enable such apparatus to be more accurate and effective in measuring transparent articles or in measuring the main profile of an article having surface irregularities or anomalies projecting from such main profile.

Other objects of the invention will become apparent to those skilled in the art to which this invention pertains from the description which follows.

SUMMARY OF THE INVENTION

The invention is thus directed to a device that may be used with and for enabling gauging instruments, which measure the thickness, diameter, circumference or other dimensional parameters of articles by means impinging or scanning the surface of the article, to make more accurate measurements of transparent articles or of the main profile of an article having surface anomalies projecting from the main profile.

The device includes a supporting structure by which the device may be readily attached to an apparatus such as the optical measuring apparatus disclosed in either the above-mentioned U.S. Pat. No. 3,765,774 or U.S. Pat. No. 3,905,705. The supporting structure is adapted to be positioned, for example, between the scanning lens and the receiving lens of the optical measuring apparatus, and is designed to allow the scanning light beam to pass through one end of the structure and out the opposite end.

A spring leaf assembly extends across and is connected to the supporting assembly from one end to the opposite end along the path that will be followed by the scanning light beam. The spring leaf assembly is sufficiently flexible as to be adapted to bear against and conform to a portion of the surface of the article to be measured. In this manner the flexible spring leaf assembly forms a substitute profile over the main profile of the article, the substitute profile suppressing any surface anomalies and providing a reference surface which may then be measured by such gauging instruments as representative of the article main profile. The electronic circuitry of the optical measuring apparatus disclosed in the aforementioned patents would be adjusted accordingly to compensate for the thickness of the spring leaf assembly.

The spring leaf assembly may include one or two elongated flexible members, depending upon the nature of measurement(s) to be made, the member or members being connected at its or their opposite ends to the supporting structure by resilient means such as springs. A single elongated flexible member may be used, for instance, to bear against the surface of a moving paper web when the device is attached to an optical measuring apparatus. Two elongated flexible members may be used which are mounted essentially parallel to each other and spaced a predetermined distance apart and relative to an article to be measured between the elongated members. The two elongated flexible members may be moved apart to permit the entry therebetween of the article to be measured, and then returned toward each other for purposes of bearing against and conforming to portions of the surface of the article.

In measuring the circumference of cylindrical members such as tobacco smoke cigarette filter rods, it may be desirable to rotate the filter rod and thus a rotatable member may be provided on the optical apparatus adjacent supporting structure so as to receive and grip one end of the filter rod. The rotatable member could be rotated by a drive means also located on the optical apparatus. The drive means and rotatable member do not constitute part of the disclosed invention. Also a swivel shutter may be provided on the supporting structure over the entrance opening for the filter rod to prevent insertion of the filter rod until the two elongated flexible members have been moved apart, the swivel shutter serving to prevent injury to the sensitive spring leaf assembly.

BRIEF DESCRIPTION OF THE DRAWINGS

In the drawings:

FIG. 6 is a schematic view of the optical measuring apparatus of FIG. 1 and illustrating another embodiment of the device of the invention as may be employed in the measurement of paper web thickness or the like.

DESCRIPTION OF THE PREFERRED EMBODIMENTS

Figure 1:
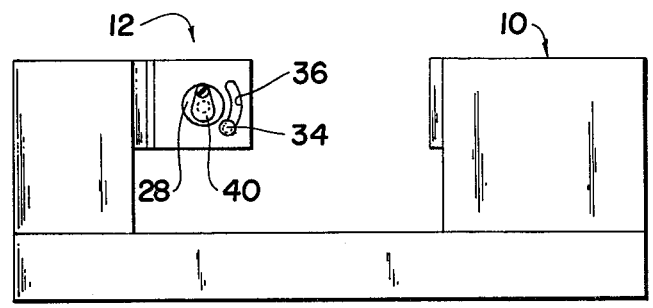
FIG. 1 is an elevational view of the device of the invention as attached to an optical measuring apparatus nearly similar to that disclosed in FIG. 1 of U.S. Pat. No. 3,765,774 or U.S. Pat. No. 3,905,705.

In reference to FIG. 1 of the drawings, an optical measuring apparatus, which is similar in appearance to that illustrated in FIG. 1 of either of the aforementioned U.S. Pat. Nos. 3,765,774 and 3,905,705, is shown at 10. The device of the hereindisclosed invention is shown at 12 attached to the optical measuring apparatus for use therewith.

Figure 2:
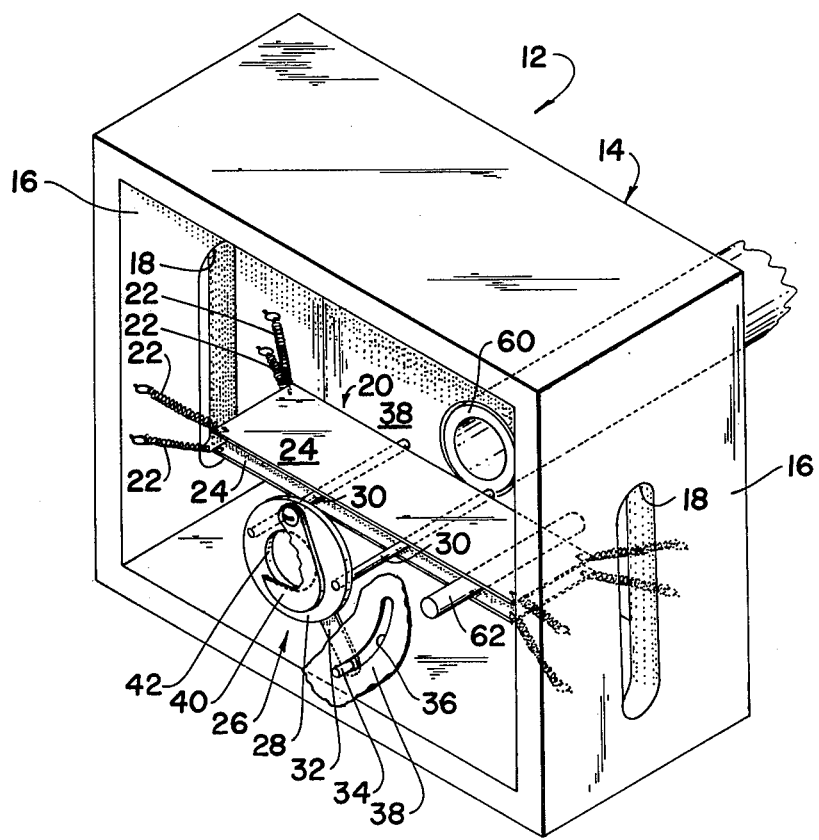
FIG. 2 is an enlarged isometric view of one embodiment of the device of the invention.

In FIG. 2, the device 12 is shown separate from the optical measuring apparatus of FIG. 1. The device may have a supporting structure 14 in the form of a substantially enclosed rectangular box that is attached to the optical apparatus in any suitable manner. The supporting structure has a pair of opposed end walls 16, which extend essentially at right angles to and across a scanning light beam when the device 12 is attached to the optical apparatus with the apparatus being in the operating mode. Each opposed end wall 16 is provided with an elongated slot 18 extending through the end wall and enabling passage through both opposed end walls of the device of the scanning light beam.

An elongated flexible assembly 20 extends across the supporting structure 14 in essentially parallel relation to the path to be followed by the scanning light beam. The opposite ends of the elongated flexible assembly are connected to the respective opposed end walls 16 by resilient members, such as springs 22, which hold the elongated flexible assembly 20 in extended manner across the supporting structure.

The elongated flexible assembly 20 may comprise two spring leaves 24, such as 0.001 inch thick stainless steel leaves. Thicker or thinner leaves, of course, may be used as desired. The length of the connecting springs 22 as well as the spring constant may be varied so as to adjust the amount of compressive force that may be brought to bear by the spring leaves 24 against an article to be measured. The spacing between the pair of spring leaves may also be varied, dependent upon the size of the article to be measured. Such spacing may be controlled by changing the location where the ends of the springs 22 are connected to the opposed end walls 16.

Although FIG. 2 illustrates two springs 22 connected to each end of one of the spring leaves 24, one spring at each end may also be used, if desired, to decrease tension on the spring leaves.

A leaf opening assembly 26 may also be mounted on the supporting structure 14, and may include an annular rotatable member 28 and two pins 30 attached to the rotatable member and extending therefrom into protruding relation between the spring leaves 24. A lever member 32 is fixed at one of its ends to the annular rotatable member, with the other end of the lever member being provided with a handle 34 extending through an arcuate slot 36 formed in one of a pair of opposed side walls 38 of the supporting structure 14. The annular rotatable member 28 is suitably journaled for rotation within one of the opposed sidewalls 38.

When the handle 34 and connected lever member 32 are moved, the annular rotatable member 28 is rotated about 90°, causing the pins 30 in turn to move the spring leaves 24 apart so that an article may be received therebetween to be measured. A pivotally mounted swivel member 40 extends over an entrance opening 42 in the annular rotatable member 28, the swivel shutter serving to prevent the insertion of an article through the entrance opening 42 in order to protect the sensitive spring leaves 24 from damage when the spring leaves have not been moved apart.

The annular rotatable member 28 of the leaf opening assembly 26 may be moved manually in the manner aforedescribed, or by a rotary or linear solenoid (not shown), if desired. Still another way to move the spring leaves apart would be to arrange two magnets on either side of the spring leaves, and upon energizing the magnets the spring leaves would be magnetically forced apart.

OPERATION a. Prior Art

Figure 3:
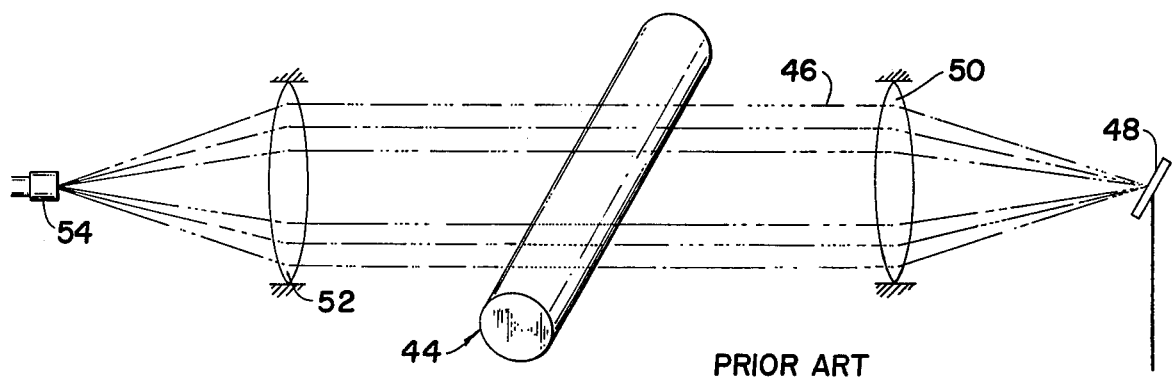
FIG. 3 is a schematic illustration of the optical measuring apparatus of FIG. 1 illustrating how articles such as tobacco smoke cigarette filter rods were measured in the prior art.

FIG. 3 represents in schematic manner the functioning of an optical measuring apparatus in the prior art in measuring either the diameter or the circumference of a cylindrical article 44, such as a tobacco smoke cigarette filter rod. The article or filter rod is shown positioned in the path of a parallel light scanning beam 46, which originates from a light source such as a laser (not shown). The light from the laser is reflected from a rotating mirror 48 and passes through a scanner lens 50, then passes over and under the article or filter rod and through a receiving lens 52 for subsequent receipt by a photodetector 54. The article or filter rod masks out or interrupts the light scanning beam. The blackout time or time interrupted by the article corresponds to the dimension of the article. The parallel light scanning beam in effect, therefore, "sees" the main profile of the diameter of the filter rod. If there are any surface irregularities or fibrils sticking above the main profile of the article, depending upon the number "seen", it may mean that the scanning light beam will "see" these irregularities or projecting fibrils as representing the main profile of the article. The resulting reading given will thus be in error.

b. Invention

Figure 4:
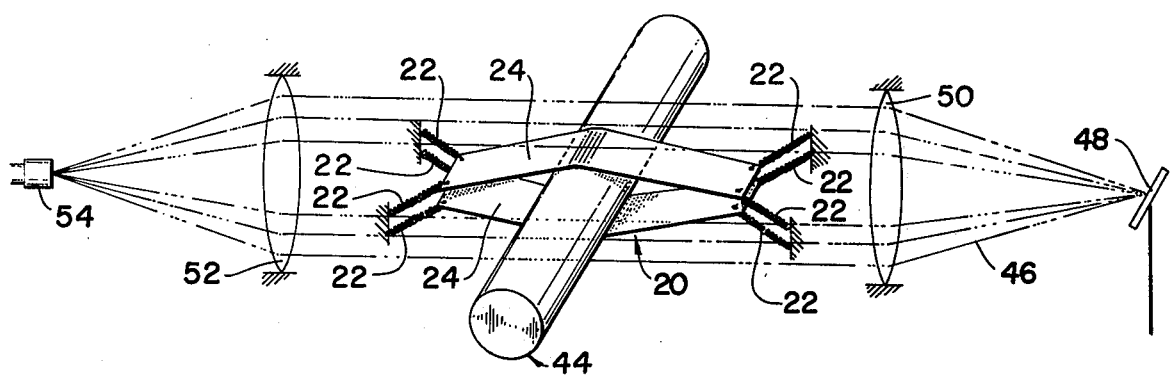
FIG. 4 is a schematic view similar to that of FIG. 3 but illustrating how the tobacco smoke cigarette filter rod is measured by the optical measuring apparatus by means of the device of the present invention.
Figure 5:
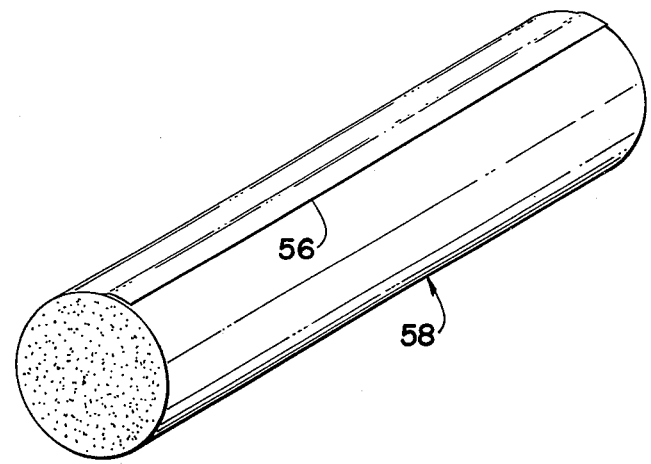
FIG. 5 illustrates a seam lip on a paper wrapped tobacco smoke cigarette filter rod.

FIG. 4 represents in schematic manner the functioning of the same optical measuring apparatus when the device of the invention is attached thereto. The spring leaves 24 bear against and conform to a portion of the surface of the cylindrical article 44 or tobacco smoke cigarette filter rod and thereby provide a substitute profile for the main profile of the article. Any surface anomalies, including particles or fibers projecting from the surface of the article, are thus suppressed by the spring leaves 24. The spring leaves thus provide a reference surface that is to be measured by the optical apparatus as representative of the main profile of the article. The scanning light beam will "see" the outer surfaces of the spring leaves at the greatest point such surfaces extend into the path of the scanning light beam. The spring leaves will also serve to force the seam lip 56 on the porous wrapped filter rod 58 shown in FIG. 5 to conform to the surface of the filter rod, thereby suppressing its contribution to error.

In reference, therefore, to FIGS. 1, 2 and 4, the leaf opening assembly 26 (FIG. 2) is rotated to spread the spring leaves 24 apart so that the cylindrical article 44 (FIG. 4) may be inserted through the entrance opening 42 and between the spring leaves until the inner end of the article is received within a rotator member 60 on the optical measuring apparatus 10. The rotator member, which may extend through an opening in one of the opposed side walls 38 of the supporting structure, has a standard Morse taper which centers and then serves to grip the cylindrical article. The leaf opening assembly is then rotated in the opposite direction to release the spring leaves 24 so that they may bear against the opposite sides of the cylindrical article, as illustrated in FIG. 4. The rotator member 60 is caused to rotate by the optical measuring apparatus, and in turn the cylindrical article is caused to rotate between the spring leaves. The substitute profile is then "read" by the optical measuring apparatus to determine circumference of the article, with the thickness of the spring leaves being taken into account by the optical measuring apparatus in order to arrive at a true reading for the circumference of the actual or main profile of the article.

CALIBRATION

In order to calibrate the optical measuring apparatus 10 and/or the attached device 12 of this invention, a metal standard 62, such as a 3 millimeter diameter metal rod, may be installed between the spring leaves 24 to one side of the annular rotatable member 28, as may be noted in FIG. 2. The metal standard 62 may be fixed to one of the opposed sidewalls 38 so as to occupy a precise position between the spring leaves 24.

In using the metal standard 62, the optical measuring apparatus 10 is activated without an article or filter rod being inserted. The parallel light scanning beam 46 "sees" across the profile or reference surface of the spring leaves 24. If the "reading" from what is "seen" should vary from a predetermined standard, this may be an indication that there has been some drift in the electronic circuitry of the optical measuring apparatus, such as in the low noise amplifiers. It also may mean that lint has collected on the surface of the spring leaves, giving a higher reading, or perhaps the spring leaves have been damaged or have a crinkle in one of the surfaces, or there has been a lessening in tension on the springs 22, or perhaps one of the springs has become detached or possibly broken. The purpose of the metal standard, therefore, is to assure that before articles or filter rods are measured, the optical measuring apparatus and attached device are working in proper manner before the insertion of the article or filter rod.

Another metal standard that may be used could be one simulating a predetermined sized filter rod to assure that filter rods subsequently measured came within certain predetermined limits, as established. This metal standard (not shown) would be inserted into the device and into the rotator member 60.

SUMMARY

It may be thus seen that currently available commercial instruments for measuring the circumference, for example, of porous wrapped tobacco smoke cigarette filter rods or nonwrapped rods are not as accurate as desired. The accuracy of pneumatic instruments is adversely affected by the porosity of the wrap. Laser scanning instruments are adversely influenced by surface characteristics and larger seam lips associated with porous wraps. The device of the invention thus provides a means for suppressing surface anomalies such as surface fibrils, seam lips, etc., which cause laser scanner circumference determinations to be inaccurate. The device, when used as an attachment with an optical measuring apparatus such as discussed herein, will provide an accurate means for circumference measurement under such circumstances as described herein and heretofore unavailable.

ALTERNATE EMBODIMENTS

The disclosed device 12, as attached to the optical measuring apparatus, may be used in different ways, as will occur to one skilled in the art to which this invention concerns. Diameters of articles may be measured, of course, and even the circumferences of wire extrusions may be made by rotating the optical measuring apparatus and its attached device around the wire as the wire is being extruded. The latter would also apply to the measurements of any insulation as it might be coextruded with the wire, or extruded around the wire as it is being drawn from a separate source. Any water droplets or oil droplets, for instance, would be suppressed by the spring leaves.

It will also be apparent that measurements may be made of glass rods and other transparent articles because the spring leaves 24 may be made opaque to the scanning light beam and thus overcome the possibility that some of the scanning light beam may pass through a portion of the transparent glass rod.

Figure 6:
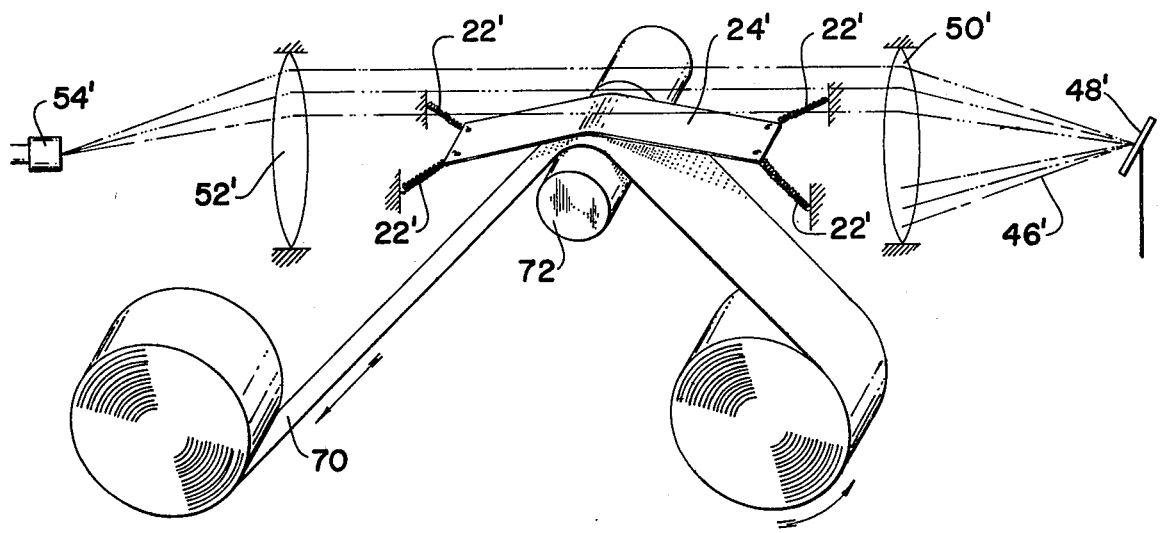

In FIG. 6, an alternate embodiment of the device is schematically illustrated in conjunction with an optical measuring apparatus such as shown in FIG. 1. The alternate construction may be used to measure on-line paper thickness. The paper web 70 is shown passing over a rotatable guide roll 72, which may extend within the device and beneath the single spring leaf 24'. The guide roll bears a predetermined spaced relationship to a starting light scan in the optical measuring apparatus. The single spring leaf 24' is shown bearing against the upper shown surface of the paper web, thereby suppressing any fuzz or any other surface anomalies present on the paper web surface. Elements of the optical measuring apparatus and device that have been previously described have been given the same reference number but with a prime mark being added after the reference number to show that this arrangement represents a different embodiment from that shown in FIG. 4, for instance.

Obviously, the same arrangement shown in FIG. 6 may be used to measure webs of other materials, or the thickness of sheets of different materials, and the like.

The invention has been described in detail with particular reference to preferred embodiments thereof, but it will be understood that variations and modifications can be affected within the spirit and scope of the invention.

I claim:

1. Device for use with and for enabling gauging instruments, which measure the thickness, diameter, circumference or other dimensional parameter of articles by means impinging or scanning the surface of the article, to make more accurate measurements of transparent articles or of the main profile of an article having surface anomalies projecting from the main profile, said device comprising:

a support means; and flexible means connected to said support means for bearing against and conforming to a portion of the surface of the article to be measured and thereby form a substitute profile on the main profile of the article, said substitute profile suppressing any said surface anomalies and providing a reference surface to be measured by said gauging instruments as representative of the article main profile.

2. Device as defined in claim 1, wherein said flexible means comprises an elongated flexible member means, and resilient means for attaching the ends of said elongated flexible member means to said support means.

3. Device as defined in claim 2, wherein means is provided for moving said elongated flexible member means into engagement with said article to be measured.

4. Device as defined in claim 2, wherein said elongated flexible member means comprises a pair of flexible members mounted essentially parallel to each other and spaced a predetermined distance apart relative to an article to be measured therebetween, and means is provided for moving said pair of flexible members farther apart relative to each other to enable positioning of said article therebetween and for releasing said pair of flexible members for movement against said portion of the surface of said article.

5. Device as defined in claim 4, wherein said means for moving said pair of flexible members comprises a hollow rotatable member means operatively mounted on said support means and defining an entrance opening for receiving therethrough said article, said hollow rotatable member means having a pair of extending members spaced parallelly apart for extending between said pair of flexible members in spaced relation therefrom; and means for rotating said rotatable member means and thereby move said pair of extending members into engagement with said flexible members to move said flexible members further apart from each other for facilitating positioning of an article between said flexible members.

6. Device as defined in claim 5, wherein a swivel shutter is pivotably mounted on said rotatable member means over said article entrance opening of said hollow rotatable member means to prevent insertion of an article to be measured when the elongated members are spaced said predetermined distance apart, said swivel shutter pivoting from over said entrance opening when said rotatable member means is rotated to move said elongated flexible members farther apart from each other.

7. Device as defined in claim 1, wherein said flexible means comprises a flexible, elongated foil-like leaf member, and resilient means for attaching the ends of said elongated foil-like leaf member to and extended across said support means.

* * * * *